(12) United States Patent
Huber et al.

(10) Patent No.: US 12,292,174 B2
(45) Date of Patent: May 6, 2025

(54) DECORATIVE ELEMENT FOR A MOTOR VEHICLE, AND PRODUCTION METHOD FOR A DECORATIVE ELEMENT

(71) Applicant: Bayerische Motoren Werke Aktiengesellschaft, Munich (DE)

(72) Inventors: Christian Huber, Landshut (DE); Maximilian Stadler, Freising (DE); Franz Troffer, Grosskoellnbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/709,909

(22) PCT Filed: Nov. 8, 2022

(86) PCT No.: PCT/EP2022/081049
§ 371 (c)(1),
(2) Date: May 14, 2024

(87) PCT Pub. No.: WO2023/099131
PCT Pub. Date: Jun. 8, 2023

(65) Prior Publication Data
US 2025/0020305 A1    Jan. 16, 2025

(30) Foreign Application Priority Data
Dec. 2, 2021  (DE) ............. 10 2021 131 743.6

(51) Int. Cl.
*F21S 43/50*  (2018.01)
*B29C 45/00*  (2006.01)
(Continued)

(52) U.S. Cl.
CPC .......... *F21S 43/50* (2018.01); *B29C 45/0055* (2013.01); *B29C 45/1671* (2013.01);
(Continued)

(58) Field of Classification Search
CPC .......... F21S 43/50; F21S 43/281; F21S 43/28; F21W 2104/00
See application file for complete search history.

(56) References Cited

U.S. PATENT DOCUMENTS

2009/0286072 A1    11/2009  Kuechler et al.
2011/0088827 A1*   4/2011   Zanini ................... B60R 13/005
                                                       156/63
(Continued)

FOREIGN PATENT DOCUMENTS

DE    10 2018 213 974 A1    2/2020
DE    10 2018 009 270 A1    5/2020
(Continued)

OTHER PUBLICATIONS

International Search Report (PCT/ISA/210) issued in PCT Application No. PCT/EP2022/081049 dated Feb. 8, 2023 with English translation (6 pages).
(Continued)

*Primary Examiner* — Robert J May
(74) *Attorney, Agent, or Firm* — Crowell & Moring LLP

(57) ABSTRACT

A decorative element for a motor vehicle comprising a transparent carrier element which can be fastened to the motor vehicle, a transparent surface layer which forms an external surface of the decorative element and is arranged on a visible side of the decorative element on the carrier element during intended use, a film printed with a predetermined pattern and arranged on a side opposite the visible side on the carrier element, and a transparent inner surface layer which forms an inner surface of the decorative element. The printed film comprises at least one transparent cut-out. A paint layer in a predetermined color is arranged (Continued)

between the printed film and the inner surface layer. A method for producing the decorative element is also disclosed.

13 Claims, 4 Drawing Sheets

(51) Int. Cl.
    *B29C 45/16*     (2006.01)
    *B60R 13/00*     (2006.01)
    *F21S 43/20*     (2018.01)
    *F21S 43/27*     (2018.01)
    *F21S 45/10*     (2018.01)
    *B29C 45/14*     (2006.01)
    *B29K 75/00*     (2006.01)
    *B29L 31/00*     (2006.01)
    *B29L 31/30*     (2006.01)
    *B60Q 1/00*     (2006.01)

(52) U.S. Cl.
    CPC ........ *B29C 45/1679* (2013.01); *B60R 13/005* (2013.01); *F21S 43/27* (2018.01); *F21S 43/281* (2024.05); *F21S 45/10* (2018.01); *B29C 2045/0058* (2013.01); *B29C 2045/0093* (2013.01); *B29C 45/14336* (2013.01); *B29C 2045/14696* (2013.01); *B29C 45/14811* (2013.01); *B29K 2075/00* (2013.01); *B29K 2995/0026* (2013.01); *B29L 2031/3005* (2013.01); *B29L 2031/722* (2013.01); *B60Q 1/00* (2013.01)

(56) References Cited

U.S. PATENT DOCUMENTS

| | | | |
|---|---|---|---|
| 2016/0318222 | A1 | 11/2016 | Deckert et al. |
| 2020/0316902 | A1 | 10/2020 | Lee et al. |
| 2021/0096221 | A1 | 4/2021 | Okumura et al. |

FOREIGN PATENT DOCUMENTS

| | | |
|---|---|---|
| DE | 20 2020 103 284 U1 | 6/2021 |
| EP | 2 099 950 B1 | 5/2012 |
| EP | 3 083 183 B1 | 10/2018 |
| JP | 2020-163690 A | 10/2020 |
| WO | WO 2020/075539 A1 | 4/2020 |

OTHER PUBLICATIONS

German-language Written Opinion (PCT/ISA/237) issued in PCT Application No. PCT/EP2022/081049 dated Feb. 8, 2023 with English translation (9 pages).

German-language Search Report issued in German Application No. 10 2021 131 743.6 dated Nov. 22, 2022 with partial English translation (14 pages).

\* cited by examiner

DECORATIVE ELEMENT FOR A MOTOR VEHICLE, AND PRODUCTION METHOD FOR A DECORATIVE ELEMENT

BACKGROUND AND SUMMARY

This disclosure relates to a decorative element for a motor vehicle having a transparent carrier element, which is fastenable on the motor vehicle. Furthermore, the disclosure relates to a method for producing the decorative element.

Decorative elements, which in particular represent an emblem, are typically embossed from aluminum and subsequently printed in color and back-injected using a plastic.

However, specific visual effects cannot be represented using the decorative element, such as a transparency effect, which is a color of a panel part of a motor vehicle shimmering through the decorative element.

It is therefore an object of the present disclosure to provide a decorative element for a motor vehicle, which enables a representation of additional visual effects.

According to the disclosure, there is proposed a decorative element for a motor vehicle having a transparent carrier element, which is fastenable on the motor vehicle, a transparent surface layer, which forms an outer surface of the decorative element and is, when used as intended, arranged on the carrier element on a visible side of the decorative element, a film printed with a predetermined pattern, which is arranged on the carrier element on a side opposite to the visible side, and a transparent inner surface layer, which forms an inner surface of the decorative element. The printed film has at least one transparent cutout and a paint layer in a predetermined color is arranged between the printed film and the inner surface layer. The decorative element having the corresponding components is preferably designed in a sandwich structure.

This has the advantage that an emblem or an individualized design may be represented via the printed film. Furthermore, a transparency effect can be represented via the predetermined color of the paint layer, which according to the disclosure has the color of a panel part of the motor vehicle on which the decorative element is to be arranged, since the color of the paint layer is visible from the visible side through the transparent cutouts provided in the printed film. In this way, an observer sees the automobile color of the motor vehicle in the decorative element and it gives the impression that the color of the motor vehicle shimmers through the decorative element.

In one advantageous embodiment variant, an edge element for fastening on the motor vehicle is formed on the carrier element. The edge element is preferably arranged circumferentially on the carrier element around the entire circumference.

The decorative element is preferably designed in such a way that the edge element of the carrier element has at least one alignment means for determining an installation position of the decorative element. It is advantageous here that the decorative element is always aligned via the alignment means in a desired position in an installed state.

In one exemplary embodiment of the disclosure, a surface of the carrier element on which the printed film is arranged is concave. This results in a three-dimensional effect of the pattern to be represented using the printed film.

Furthermore, an embodiment in which at least the transparent surface layer on the visible side of the decorative element is planar is advantageous. The surface layer is preferably adapted to a geometry of the surface of the motor vehicle on which the decorative element is to be arranged. In this way, a visually appealing transition between the surface of the motor vehicle and the decorative element is ensured.

According to the disclosure, in a further advantageous variant, the transparent surface layer and the transparent inner surface layer are a protective layer. This protective layer made of clear lacquer, for example, prevents soiling or penetration of water between the layers of the decorative element.

The decorative element according to the disclosure is designed in one embodiment variant such that the carrier element or the edge element comprises a light source for illuminating the printed film. In this way, the pattern of the printed film to be represented can be illuminated and highlighted. However, it would also be conceivable to illuminate only a border or individual elements of the pattern. Furthermore, it is possible via the illumination by, for example, light-emitting diodes or optical fibers to illuminate the decorative part in various colors.

In a preferred embodiment of the disclosure, the decorative element is an emblem.

According to the disclosure, there is further proposed a panel part for a motor vehicle having a decorative element according to the above disclosure, in which the decorative element is fastened on the panel part and the panel part has the predetermined color of the paint layer. In this way, a transparency effect may be implemented.

In one exemplary embodiment of the disclosure, the decorative element is fastened on the panel part via the inner surface layer. The decorative element is, for example, adhesively bonded on the panel part here and no further processing steps are necessary for the production or installation.

In one advantageous embodiment variant, a cutout is provided, into which the decorative element is inserted such that the visible side of the decorative element is visible from a visible side of the panel part. The decorative element is fastened here on a side opposite to the visible side of the panel element. According to the disclosure, in one advantageous variant, the decorative element is fastened via the edge element on the panel part. This has the advantage that the decorative element is inserted into the cutout from the side of the panel part opposite to the visible side and can form a flush transition with the panel part in this way. Furthermore, all components provided for the fixing and alignment are not visible from the visible side. The decorative element is, for example, adhesively bonded, clipped, welded, screwed, or hot stamped on the panel part via corresponding fastening elements here.

In a preferred embodiment of the disclosure, the panel part has at least one positioning means, corresponding to the alignment means, for positioning the decorative part on the panel part on the side opposite to the visible side of the panel part.

Furthermore, according to the disclosure, there is proposed a method for producing a decorative part according to the above disclosure, which first comprises providing a printed film having at least one transparent cutout and then inserting the printed film into an injection mold. This is followed by back-injecting the printed film using a transparent plastic to produce the carrier element and in-mold flooding using polyurethane to produce the transparent surface layer. The printed film is then painted on a side opposite to the carrier element via the paint layer in a predetermined color and then a transparent protective layer is applied to produce the surface layer and the inner surface layer.

In an alternative embodiment of the present method, it is furthermore provided that after the in-mold flooding, stamping or laser cutting of the carrier element is carried out to produce the edge element.

The above-disclosed features can be combined with one another as desired, provided this is technically possible and they are not contradictory to one another.

Other advantageous refinements of the disclosure are described in more detail hereinafter together with the description of the preferred embodiment of the disclosure on the basis of the figures.

The figures are exemplary and schematic. Identical reference signs in the figures indicate identical functional and/or structural features.

DETAILED DESCRIPTION OF THE DRAWINGS

Figure 1:
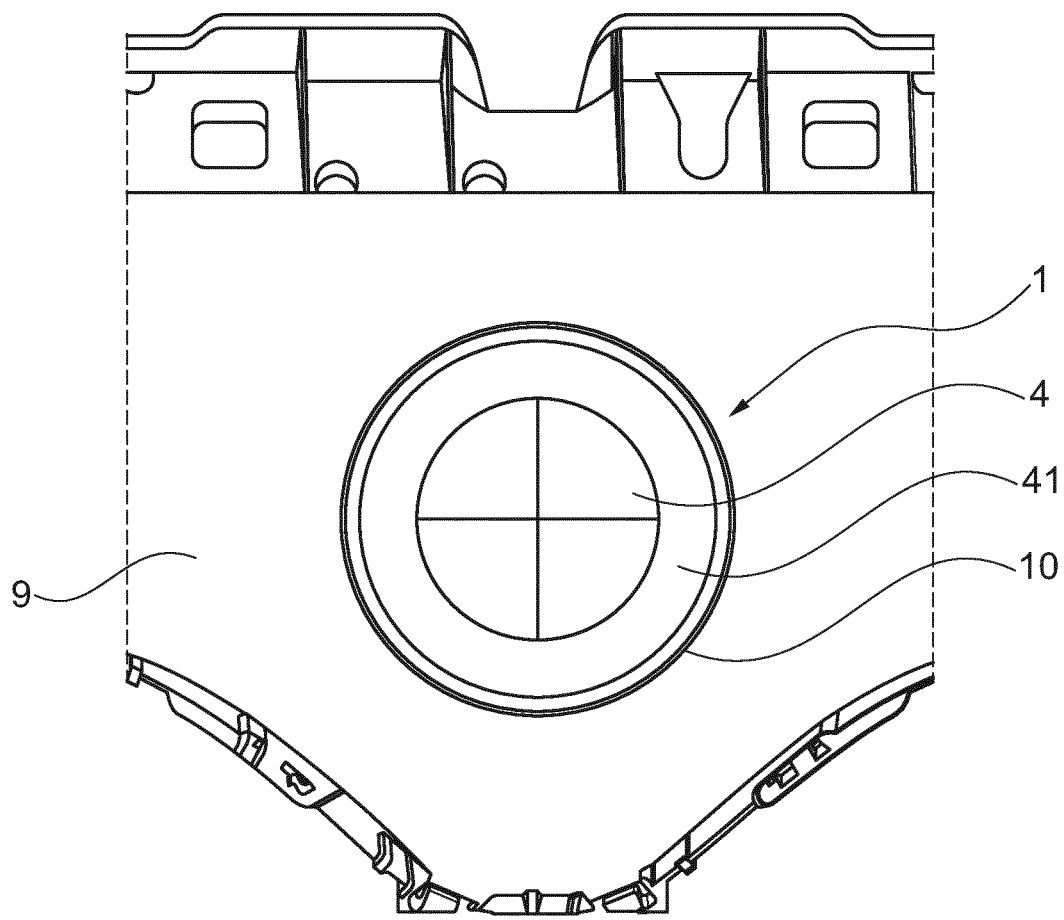
FIG. 1 shows a top view of a panel part for a motor vehicle having a decorative element.

FIG. 1 shows a top view of a panel part 9 for a motor vehicle having a decorative element 1. The decorative element 1 comprises a transparent carrier element 2, a transparent surface layer 3, which forms an outer surface of the decorative element 1 and is, when used as intended, arranged on the carrier element 2 on a visible side S of the decorative element 1, a film 4 printed with a predetermined pattern, which is arranged on the carrier element 2 on a side opposite to the visible side S, and a transparent inner surface layer 5, which forms an inner surface of the decorative element 1. The printed film 4 has a transparent cutout 41 and a paint layer 6 in a predetermined color is arranged between the printed film 4 and the inner surface layer 5 such that the paint layer 6 is visible from the visible side through the transparent cutout 41. The decorative element 1 is an emblem.

Furthermore, a cutout 10 is provided on the panel part 9, into which the decorative element 1 is inserted such that the visible side S of the decorative element 1 is visible from a visible side of the panel part 9. Moreover, the panel part 9 has the predetermined color of the paint layer 6.

Figure 2:
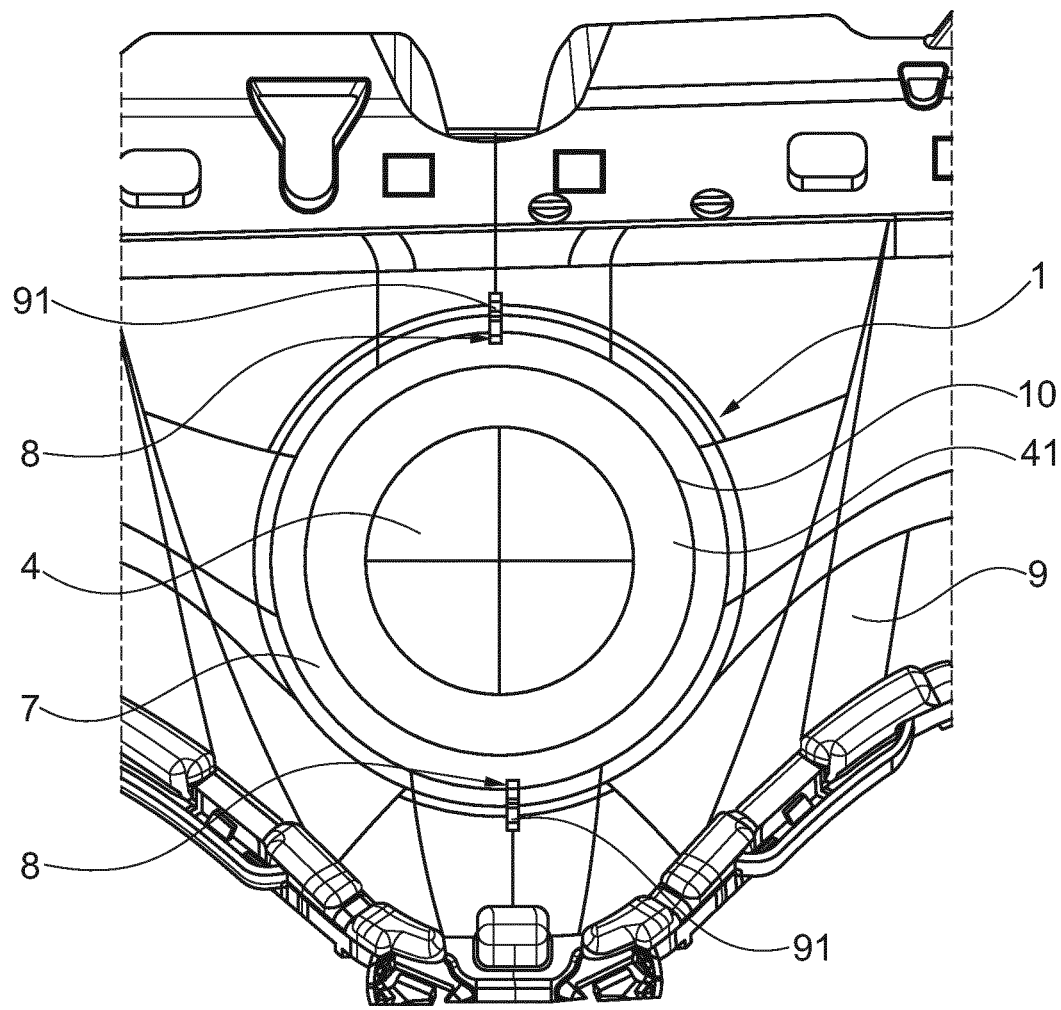
FIG. 2 shows a view from below of the panel part for a motor vehicle having the decorative element.

FIG. 2 shows a view from below of the panel part 9 for a motor vehicle having the decorative element 1 that was shown in FIG. 1. The decorative element 1 is fastened on the panel part 9 on a side opposite to the visible side of the panel part 9. For this purpose, an edge element 7 for fastening on the panel part 9 is formed on the carrier element 2, by which the decorative element 1 is fastened via the edge element 7 on the panel part 9. In addition, the edge element 7 of the carrier element 2 has two alignment means 8 for determining an installation position of the decorative element 1. Moreover, on the side opposite to the visible side of the panel part 9, two positioning means 91 corresponding to the respective alignment means 8 are formed for positioning the decorative element 1 on the panel part 9. In some embodiments, the alignment means 8 and the positioning means 91 may comprise structure having mating geometries. For example, the alignment means 8 may comprise a protrusion (e.g., a peg), and the positioning means 91 may comprise a notch (e.g., a detent) sized and shaped to receive the protrusion, or vice versa.

Figure 3:
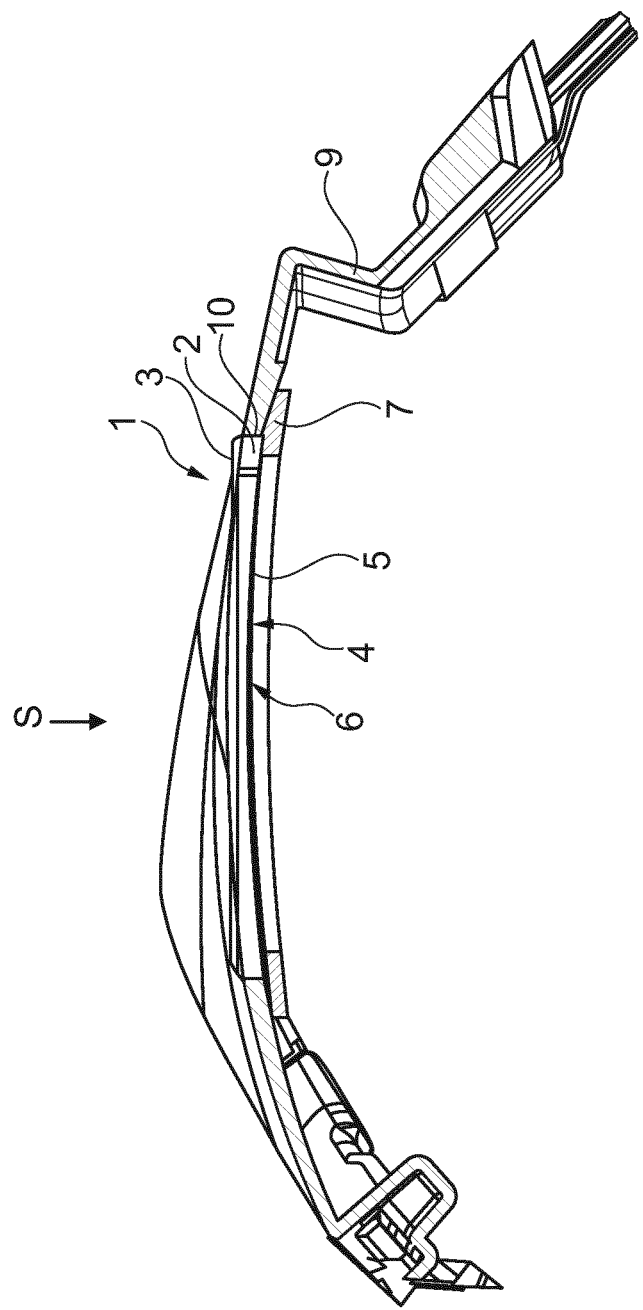
FIG. 3 shows a sectional view of the panel part for a motor vehicle having the decorative element; and, FIG. 4 shows a further sectional view of the panel part for a motor vehicle having the decorative element.
Figure 4:
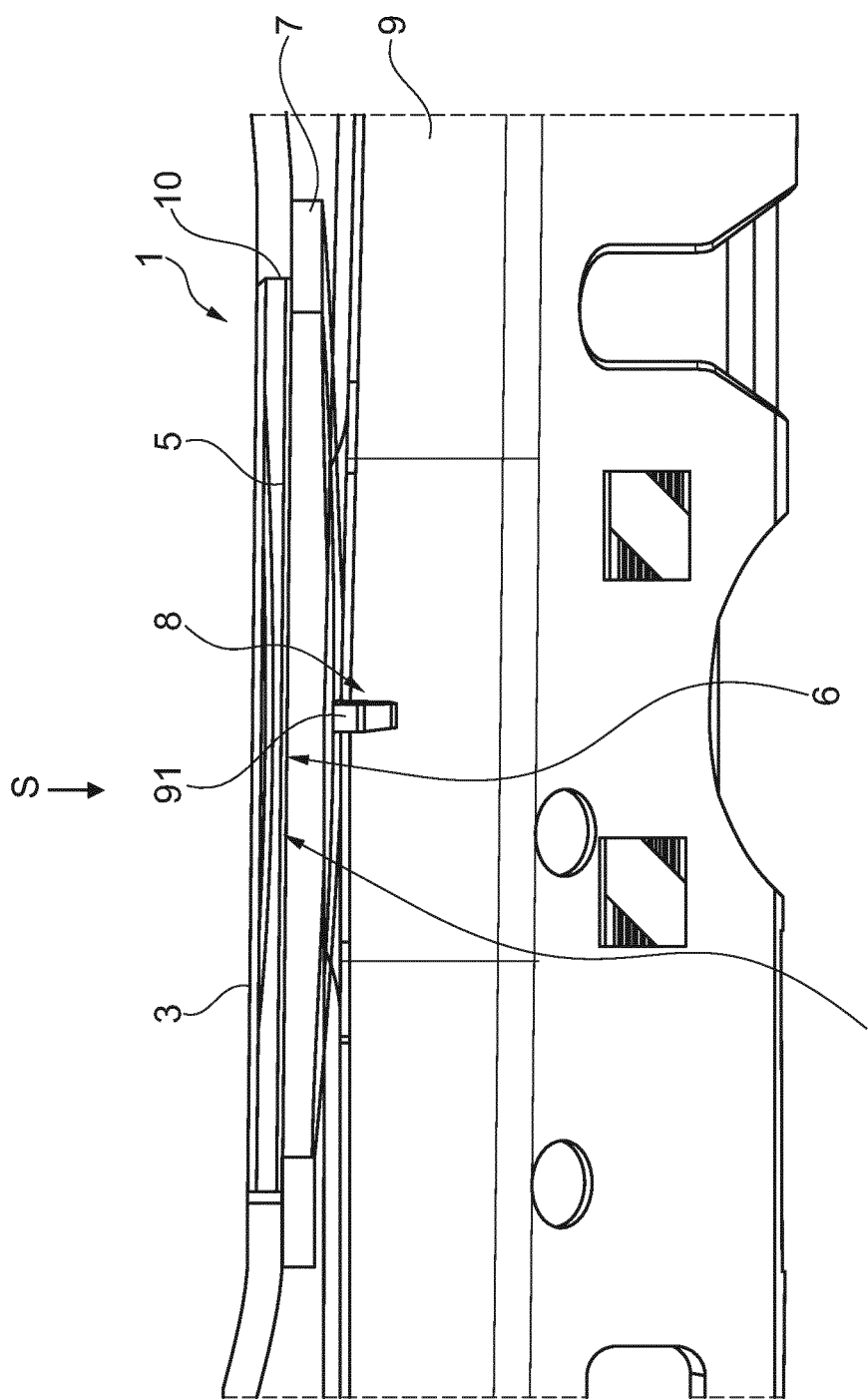

FIGS. 3 and 4 each show a sectional view of the panel part 9 for a motor vehicle having the decorative element 1 that was shown in FIGS. 1 and 2. A surface of the carrier element 2 on which the printed film 4 is arranged is concave. In addition, the transparent surface layer 3 on the visible side S of the decorative element 1 is planar. The transparent surface layer 3 and the transparent inner surface layer 5 are a protective layer made of clear lacquer.

The disclosure is not restricted in its execution to the above-specified preferred exemplary embodiments. Rather, a number of variants which make use of the described achievement of the object even in the case of embodiments of a fundamentally different nature are conceivable.

What is claimed is:

1. A decorative element for a motor vehicle, comprising:
a transparent carrier element fastenable on the motor vehicle,
a transparent surface layer forming an outer surface of the decorative element and is, when used as intended, arranged on the carrier element on a visible side of the decorative element,
a film printed with a predetermined pattern arranged on the carrier element on a side opposite to the visible side, and
a transparent inner surface layer forming an inner surface of the decorative element,
wherein the printed film has at least one transparent cutout, and
wherein a paint layer in a predetermined color is arranged between the printed film and the inner surface layer.

2. The decorative element according to claim 1, wherein an edge element for fastening on the motor vehicle is formed on the carrier element.

3. The decorative element according to claim 2, wherein the edge element of the carrier element has at least one alignment means for determining an installation position of the decorative element.

4. The decorative element according to claim 2, wherein the carrier element or the edge element comprises a light source for illuminating the printed film.

5. The decorative element according to claim 1, wherein a surface of the carrier element on which the printed film is arranged is concave.

6. The decorative element according to claim 1, wherein at least the transparent surface layer on the visible side of the decorative element is planar.

7. The decorative element according to claim 1, wherein the transparent surface layer and the transparent inner surface layer are a protective layer.

8. The decorative element according to claim 1, wherein the decorative element is an emblem.

9. A panel part for a motor vehicle having a decorative element according to claim 1, wherein the decorative element is fastened on the panel part and wherein the panel part has the predetermined color of the paint layer.

10. The panel part according to claim 9, wherein the decorative element is fastened on the panel part via the inner surface layer.

11. The panel part according to claim 9, comprising a cutout into which the decorative element is inserted such that the visible side of the decorative element is visible from a visible side of the panel part, wherein the decorative element is fastened on a side opposite to the visible side of the panel part.

12. The panel part according to claim 11, wherein the decorative element is fastened via the edge element on the panel part.

13. The panel part according to claim 11, wherein the panel part has at least one positioning means, corresponding to the alignment means, for positioning the decorative part on the panel part on the side opposite to the visible side of the panel part.

\* \* \* \* \*